UNITED STATES PATENT OFFICE.

BERTRAM MAYER AND ADOLF PFANNENSTIEL, OF BASEL, SWITZERLAND, ASSIGNORS TO SOCIETY OF CHEMICAL INDUSTRY IN BASLE, OF BASEL, SWITZERLAND.

SULFUR VAT DYE AND PROCESS OF MAKING SAME.

No. 927,868.    Specification of Letters Patent.    Patented July 13, 1909.

Application filed September 24, 1908. Serial No. 454,629.

*To all whom it may concern:*

Be it known that we, BERTRAM MAYER, doctor of philosophy and chemist, and ADOLF PFANNENSTIEL, doctor of philosophy and chemist, both subjects of the King of Bavaria, and residents of Basel, Switzerland, have invented new and useful Sulfureted Vat Dyestuffs and a Process of Making Same, of which the following is a full, clear, and exact specification.

We have found, that by heating 2-methyl-benzanthrone with sulfur or alkali polysulfids to a high temperature, new sulfureted dyestuffs are produced, which dye unmordanted cotton from an alkaline hydrosulfite vat bluish green, olive, greenish black to deep black shades of excellent fastness to washing, light and chlorin.

The following examples illustrate the invention:

Example 1: 10 parts of 2-methylbenzanthrone are heated with 50 parts of sulfur to 200–240° C. until the evolution of hydrogen sulfid has ceased. The cooled mass is finely powdered and the excess of sulfur is extracted from it by carbon bisulfid or a sodium sulfid solution. The dyestuff thus purified is a nearly black powder, insoluble in most organic solvents. It dissolves difficultly in boiling nitrobenzene with a dirty Bordeaux-red color and intensive fluorescence. Its solution in concentrated sulfuric acid shows a violet-red, and in fuming sulfuric acid a violet-black coloration. With hydrosulfite the dyestuff yields an olive colored vat from which cotton is dyed in green shades turning to a very fast blue-green by exposure to the air.

Example 2: 10 parts of 2-methylbenzanthrone are heated with 40–50 parts of sulfur to 300–330° C. until the evolution of hydrogen sulfid has ceased. The resulting dyestuff dissolves in concentrated sulfuric acid with a dirty violet-red coloration and in fuming sulfuric acid with a brown-black color. In boiling nitrobenzene it is only difficultly soluble with a brown-red color and intensive fluorescence. The alkaline hydrosulfite vat is olive. On cotton the new dyestuff yields deep black dyeings of excellent fastness to washing and chlorin.

Example 3: 10 parts of 2-methylbenzanthrone are heated with 100 parts of sodium tetrasulfid during one hour to 200–240° C. The cooled melted mass is dissolved in hot water and filtered. The residue is washed with water and dried. It forms a black powder and may be used directly for dyeing. The new dyestuff dissolves in concentrated sulfuric acid with brown-red and in fuming sulfuric acid with a brown coloration. In hot nitrobenzene it is scarcely soluble. With caustic soda lye and hydrosulfite it yields a blue vat, from which cotton is dyed in blue shades turning from blackish olive to green-black by their exposition to the air.

The hereinbefore mentioned proportions of methylbenzanthrone and sulfur or alkali polysulfid and also the temperature may be varied within wide limits.

What we claim is:

1. The described process for the manufacture of new sulfureted vat-dyestuffs of the anthracene-series, which consists in heating 2-methylbenzanthrone with sulfur to a high temperature.

2. The described process for the manufacture of new sulfureted vat-dyestuffs of the anthracene-series, which consists in heating 2-methylbenzanthrone with an alkali polysulfid to a high temperature.

3. As new products, the vat-dyestuffs obtained by heating 2-methylbenzanthrone with sulfur to a high temperature, constituting, in dry state, black powders, soluble in concentrated sulfuric acid with a violet-red coloration and in fuming sulfuric acid with from brownish black to violet-black coloration, difficultly soluble in hot nitrobenzene from dirty Bordeaux-red to brown-red solutions and yielding with alkaline reducing agents olive vats dyeing unmordanted cotton bluish green to deep black shades fast to washing, light and chlorin.

4. As new products, the vat-dyestuffs, obtainable by heating 2-methylbenzanthrone with an alkali polysulfid to a high temperature, constituting, in dry state, black powders, soluble in concentrated sulfuric acid with brown-red coloration and in fuming sulfuric acid with a brown coloration, being scarcely soluble in hot nitrobenzene and yielding with alkaline reducing agents blue vats dyeing unmordanted cotton blue shades turning to blackish olive to green-black by their exposition to the air.

In witness whereof, we have hereunto signed our names in the presence of two subscribing witnesses.

BERTRAM MAYER.
ADOLF PFANNENSTIEL.

Witnesses:
 ERNST WAGNER,
 AMAND RITTER.